United States Patent
Ehrlich et al.

(10) Patent No.: US 8,982,499 B1
(45) Date of Patent: Mar. 17, 2015

(54) TIMING OF POWER STATE CHANGE IN A DISK DRIVE BASED ON DISK ACCESS HISTORY

(71) Applicant: Kabushiki Kaisha Toshiba, Tokyo (JP)

(72) Inventors: Richard M. Ehrlich, Saratoga, CA (US); Mine Wonkyung Budiman, Livermore, CA (US); Eric R. Dunn, Cupertino, CA (US); Annie Mylang Le, San Jose, CA (US); Fernando Anibal Zayas, Rangiora (NZ)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/975,207

(22) Filed: Aug. 23, 2013

(51) Int. Cl.
*G11B 15/18* (2006.01)
*G11B 5/012* (2006.01)

(52) U.S. Cl.
CPC ...................................... *G11B 5/012* (2013.01)
USPC ........................................................... 360/69

(58) Field of Classification Search
None
See application file for complete search history.

(56) References Cited

U.S. PATENT DOCUMENTS

| | | | | |
|---|---|---|---|---|
| 5,682,273 A * | 10/1997 | Hetzler | ............................ | 360/75 |
| 5,778,418 A * | 7/1998 | Auclair et al. | ................ | 711/101 |
| 5,954,820 A * | 9/1999 | Hetzler | ......................... | 713/323 |
| 6,892,313 B1 | 5/2005 | Codilian et al. | | |
| 7,334,082 B2 | 2/2008 | Grover et al. | | |
| 7,552,347 B2 * | 6/2009 | Schutte | ......................... | 713/300 |
| 7,564,639 B2 * | 7/2009 | Korst et al. | ..................... | 360/69 |
| 7,818,494 B2 * | 10/2010 | Inoue | ............................. | 711/103 |
| 7,856,563 B1 * | 12/2010 | Sade et al. | ..................... | 713/300 |
| 2006/0075185 A1 | 4/2006 | Azzarito et al. | | |

* cited by examiner

*Primary Examiner* — K. Wong
(74) *Attorney, Agent, or Firm* — Patterson & Sheridan, LLP (57) ABSTRACT

A data storage device that includes a magnetic storage device and a non-magnetic nonvolatile storage device that measures a hit rate of read/write commands that result in accesses to the non-magnetic nonvolatile storage device, and adjusts a length of a time period, such as an idle time, based on the hit rate. The duration of the time period can be set each time the magnetic storage device is accessed. Upon expiration of the time period, if the magnetic storage device has not yet been accessed, the magnetic storage device is changed from a higher power consumption state to a lower power consumption state.

20 Claims, 6 Drawing Sheets

TIMING OF POWER STATE CHANGE IN A DISK DRIVE BASED ON DISK ACCESS HISTORY

BACKGROUND

Disk drives primarily store digital data in concentric tracks on the surface of a data storage disk and are commonly used for data storage in electronic devices. The data storage disk is typically a rotatable hard disk with a layer of magnetic material thereon, and data are read from or written to a desired track on the data storage disk using a read/write head that is held proximate to the track while the disk spins about its center at a constant angular velocity. To properly align the read/write head with a desired track during a read or write operation, disk drives generally use a closed-loop servo system that relies on servo data stored in servo sectors written on the disk surface when the disk drive is manufactured.

Some operations in a disk drive use a significant amount of energy, even when read or write commands are not being serviced by the disk drive. For example, continuously spinning the data storage disk requires approximately the same power whether or not read or write commands are being performed. Similarly, actively controlling read/write head position with the servo system involves performing servo sampling, signal processing, and associated decoding with a read channel, all of which utilize substantial computational resources, independent of read or write commands.

Because disk drives are frequently used in portable electronic devices in which available power is limited, such as laptop computers, restricting such energy-intensive operations in a disk drive is generally advantageous. Consequently, portable electronic devices typically employ power management systems that reduce disk drive power consumption by changing the disk drive to a lower power state after a period of inactivity. For example, a disk drive may stop servoing a read/write head over a data storage disk when the disk drive is idle for a predetermined period of time and "float" all read/write heads until a data storage disk is accessed. In this way, aerodynamic drag may be reduced on the rotating disk as well as the energy required to actively control read/write head position. However, if a disk access takes place shortly after the drive has changed to this lower power state, recovery from the lower power state may consume more energy than was saved by entering into the lower power state. Furthermore, delay associated with recovering from a lower power state before performing a disk access can significantly degrade user experience when a disk drive shifts to a lower power state prematurely. Consequently, there is a need in the art for systems and methods for timing when changes in the power state of a disk drive should occur.

SUMMARY

Embodiments provide systems and methods of power management in a data storage device that includes a magnetic storage device and a nonvolatile storage device. During operation, the data storage device measures a hit rate of read and/or write commands (referred to herein as "read/write commands") that result in accesses to the nonvolatile storage device and adjusts a length of a time period based on the hit rate. The time period may be an idle time that occurs before the data magnetic storage device changes to a lower power consumption state, and the duration of the time period may be set each time the magnetic storage device is accessed. Upon expiration of the time period, if the magnetic storage device has not yet been accessed during that time period, the magnetic storage device is changed from a higher power consumption state to a lower power consumption state. For example, upon expiration of the time period, the power consumption state may be changed from an active servo state to an intermediate power consumption state, a park state, and/or a standby state, depending on the power consumption state of the magnetic storage device at that time.

A method of power management in a data storage device that includes a magnetic storage device and a nonvolatile storage device, according to one embodiment, comprises setting a time period each time the magnetic storage device is accessed, the magnetic storage device being changed to a lower power consumption state when the time period expires, measuring a number of accesses to the data storage device that are accesses to the nonvolatile storage device, and adjusting a length of the time period based on the measured number of accesses.

According to another embodiment, a method of power management in a data storage device that includes a magnetic storage device and a nonvolatile storage device, according to one embodiment, comprises setting a time period each time the magnetic storage device is accessed, the magnetic storage device being changed to a lower power consumption state when the time period expires, determining whether or not a time that the magnetic storage device is next accessed is within a predetermined time interval after the time period expires, and adjusting the length of the time period based on whether or not the time the magnetic storage device is next accessed is within the predetermined time interval.

According to another embodiment, a data storage device comprises a magnetic storage device, a nonvolatile storage device, and a controller. The controller is configured to set a time period each time the magnetic storage device is accessed, the magnetic storage device being changed to a lower power consumption state when the time period expires. The controller is further configured to measure a number of accesses to the data storage device that are accesses to the nonvolatile storage device, and adjust a length of the time period based on the measured number of accesses.

BRIEF DESCRIPTION OF THE DRAWINGS

So that the manner in which the above recited features of the embodiments can be understood in detail, a more particular description of the embodiments, briefly summarized above, may be had by reference to the appended drawings. It is to be noted, however, that the appended drawings illustrate only typical embodiments and are therefore not to be considered limiting of its scope, for there may be other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
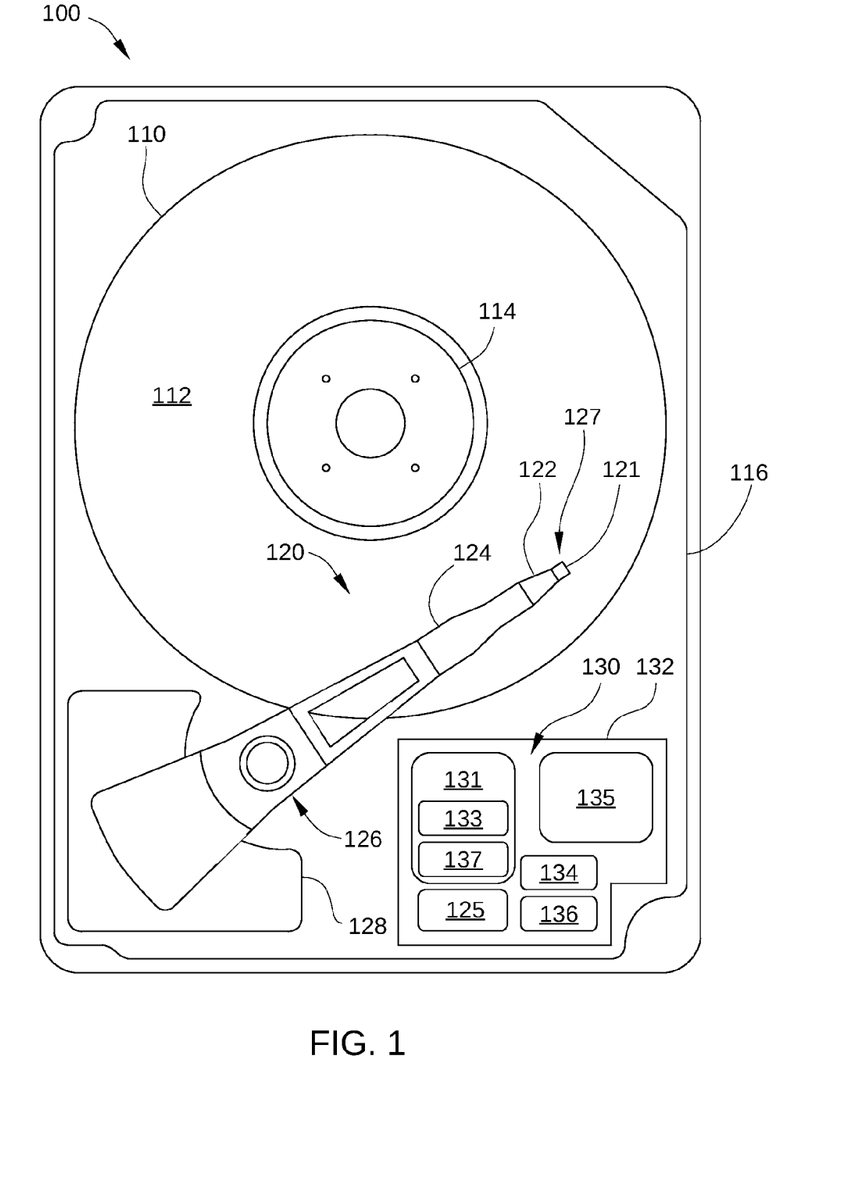
FIG. 1 is a schematic view of an exemplary hybrid drive, according to one embodiment.

FIG. 1 is a schematic view of an exemplary hybrid disk drive, according to one embodiment. For clarity, hybrid drive 100 is illustrated without a top cover. Hybrid drive 100 includes at least one storage disk 110 that is rotated by a spindle motor 114 and includes a plurality of concentric data storage tracks. Spindle motor 114 is mounted on a base plate 116. An actuator arm assembly 120 is also mounted on base plate 116, and has a slider 121 mounted on a flexure arm 122 with a read/write head 127 that reads data from and writes data to the data storage tracks. Flexure arm 122 is attached to an actuator arm 124 that rotates about a bearing assembly 126. Voice coil motor 128 moves slider 121 relative to storage disk 110, thereby positioning read/write head 127 over the desired concentric data storage track disposed on the surface 112 of storage disk 110. Spindle motor 114, read/write head 127, and voice coil motor 128 are controlled by electronic circuits 130, which are mounted on a printed circuit board 132. Electronic circuits 130 include a read/write channel 137, a microprocessor-based controller 133, random-access memory (RAM) 134 (which may be a dynamic RAM and is used as a data buffer), and/or a flash memory device 135 and flash manager device 136. In some embodiments, read/write channel 137 and microprocessor-based controller 133 are included in a single chip, such as a system-on-chip 131. In some embodiments, hybrid drive 100 may further include a motor-driver chip 125, which accepts commands from microprocessor-based controller 133 and drives both spindle motor 114 and voice coil motor 128.

For clarity, hybrid drive 100 is illustrated with a single storage disk 110 and a single actuator arm assembly 120. Hybrid drive 100 may also include multiple storage disks and multiple actuator arm assemblies. In addition, each side of storage disk 110 may have an associated read/write head coupled to a flexure arm.

When data are transferred to or from storage disk 110, actuator arm assembly 120 sweeps an arc between an inner diameter (ID) and an outer diameter (OD) of storage disk 110. Actuator arm assembly 120 accelerates in one angular direction when current is passed in one direction through the voice coil of voice coil motor 128 and accelerates in an opposite direction when the current is reversed, thereby allowing control of the position of actuator arm assembly 120 and attached read/write head 127 with respect to storage disk 110. Voice coil motor 128 is coupled with a servo system known in the art that uses the positioning data read from servo wedges on storage disk 110 by read/write head 127 to determine the position of read/write head 127 over a specific data storage track. The servo system determines an appropriate current to drive through the voice coil of voice coil motor 128, and drives said current using a current driver and associated circuitry.

Hybrid drive 100 is configured as a hybrid drive, in which nonvolatile data storage may be performed using storage disk 110 and/or flash memory device 135. In a hybrid drive, nonvolatile memory, such as flash memory device 135, supplements the spinning storage disk 110 to provide faster boot, hibernate, resume and other data read-write operations, as well as lower power consumption. Such a hybrid drive configuration is particularly advantageous for battery operated computer systems, such as mobile computers or other mobile computing devices. In a preferred embodiment, flash memory device 135 is a nonvolatile storage medium, such as a NAND flash chip, that can be electrically erased and reprogrammed, and is sized to supplement storage disk 110 in hybrid drive 100 as a nonvolatile storage medium. For example, in some embodiments, flash memory device 135 has data storage capacity that is orders of magnitude larger than RAM 134, e.g., gigabytes (GB) vs. megabytes (MB).

Figure 2:
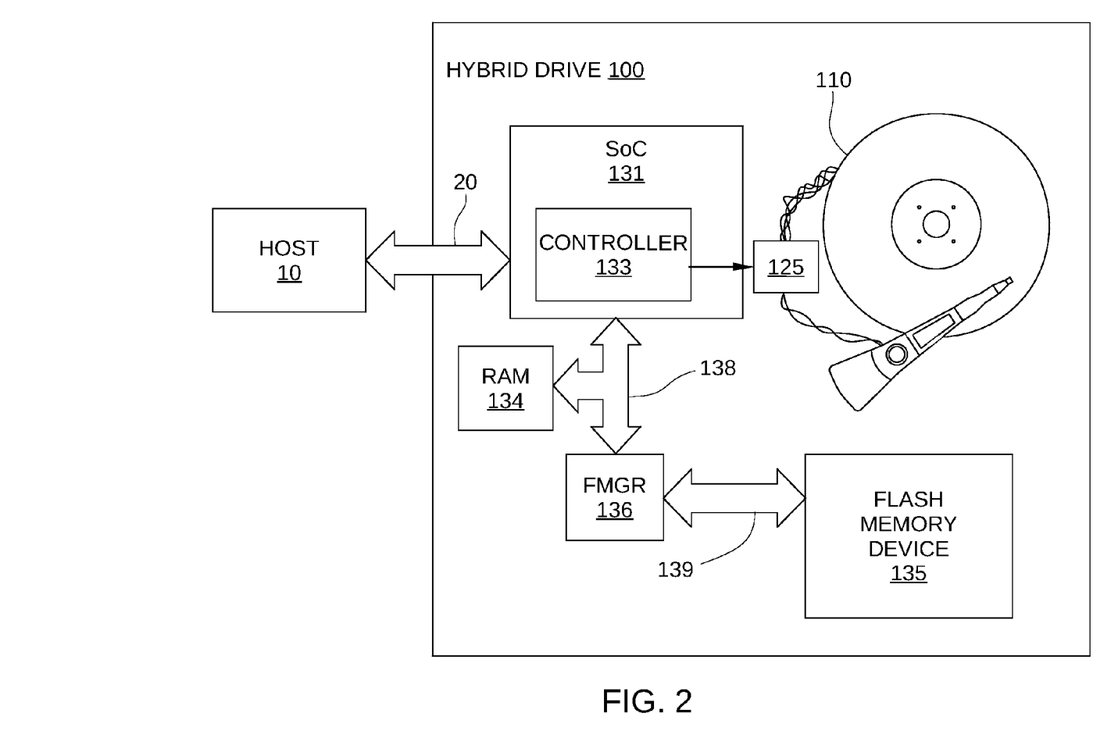
FIG. 2 illustrates an operational diagram of a hybrid drive with elements of electronic circuits shown configured according to one embodiment.

FIG. 2 illustrates an operational diagram of hybrid drive 100 with elements of electronic circuits 130 shown configured according to one embodiment. As shown, hybrid drive 100 includes RAM 134, flash memory device 135, a flash manager device 136, system-on-chip 131, and a high-speed data path 138. Hybrid drive 100 is connected to a host 10, such as a host computer, via a host interface 20, such as a serial advanced technology attachment (SATA) bus.

In the embodiment illustrated in FIG. 2, flash manager device 136 controls interfacing of flash memory device 135 with high-speed data path 138 and is connected to flash memory device 135 via a NAND interface bus 139. System-on-chip 131 includes microprocessor-based controller 133 and other hardware (including read/write channel 137) for controlling operation of hybrid drive 100, and is connected to RAM 134 and flash manager device 136 via high-speed data path 138. Microprocessor-based controller 133 is a control unit that may include one or more microcontrollers such as ARM microprocessors, a hybrid drive controller, and any control circuitry within hybrid drive 100. High-speed data path 138 is a high-speed bus known in the art, such as a double data rate (DDR) bus, a DDR2 bus, a DDR3 bus, or the like. In other embodiments, hybrid drive 100 may be configured with different data interfaces and buses that illustrated in FIG. 2.

In general, data storage devices with rotatable storage disks, such as disk drives, can be configured to minimize energy use by changing to lower power-consumption states when the data storage device is not being used to satisfy read or write commands. This is particularly true for disk drives used in battery-powered devices, such as laptop computers. For example, when a data storage device does not receive host commands for a predetermined time period, the data storage device may change from an active servo state to an intermediate power consumption state, a park state, or a standby state. Thus, in reference to hybrid drive 100 illustrated in FIGS. 1 and 2, when read or write commands are exclusively satisfied using RAM 134 and/or flash memory device 135 for a predetermined time period, actuator arm assembly 120, voice coil motor 128, spindle motor 114, read/write channel 137 and/or microprocessor-based controller 133 may be operated at a lower power consumption state, since storage disk 110 is not being accessed.

According to various embodiments, one or more predetermined time periods, which are associated with a magnetic data storage device of a hybrid drive, are adjusted in duration based at least in part on "hit rate" of read/write commands that result in accesses to a nonvolatile storage device of the hybrid drive. In other words, as the proportion of read/write commands that result in accesses to the nonvolatile storage device increases relative to commands that result in magnetic data storage device accesses, the one or more predetermined time periods are reduced in length. Thus, when the magnetic data storage device of the hybrid drive is accessed less frequently, the magnetic storage device is changed to one or more lower power consumption states sooner. This adjustment is made because, when extrapolating based on previous behavior of the hybrid drive, the likelihood of future accesses to the magnetic data storage device is lower. Consequently, energy can be saved by changing the magnetic data storage device to the lower power consumption state more quickly.

Figure 3:
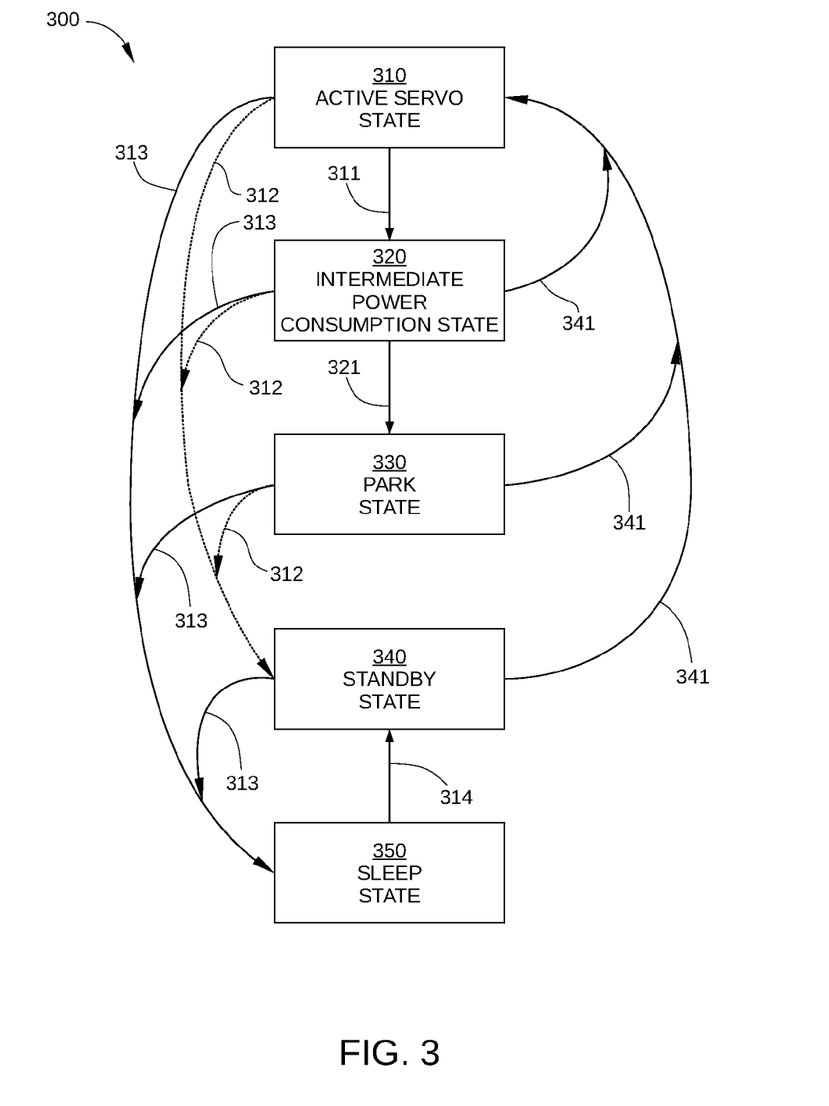
FIG. 3 illustrates a power-state diagram of the hybrid drive of FIG. 1.

FIG. 3 illustrates a power-state diagram 300 for hybrid drive 100 that includes multiple power states and power state transitions of hybrid drive 100. Power states in power-state diagram 300 include an active servo state 310, an intermediate power consumption state 320, a park state 330, a standby state 340, and a sleep state 350. State transitions in power-state diagram 300 include a float timer expiration 311, a standby transition 312, a sleep command 313, a host soft reset 314, a park timer expiration 321, and an active servo transition 341. According to embodiments of the invention, float timer expiration 311, standby transition 312, and park timer expiration 321 each occur based on predetermined time periods (a float timer, a standby timer, and a park timer, respectively) that may be adjusted based on disk access history of storage disk 110. Disk access history may include a hit rate of read/write commands that result in accesses to storage disk 110 and/or events in which an energy cost associated with hybrid drive 100 returning to an active servo state from a lower power consumption state exceeds energy saved while hybrid drive 100 was in the lower power consumption state. While the elements of power-state diagram 300 are described in terms of hybrid drive 100, it should be recognized that power-state diagram 300 is applicable to any suitable data storage device that includes a magnetic storage disk and a nonvolatile data storage device.

Active servo state 310 represents normal operation of hybrid drive 100 to facilitate the execution of read/write commands, either from host 10 or initiated by hybrid drive 100 itself. In active servo state 310, the servo system of hybrid drive 100 actively controls the position of read/write head 127 with respect to individual tracks on storage disk 110, using voice coil motor 128, actuator arm 124, and read/write channel 137. It is noted that hybrid drive 100 may be in active servo state 310 when read or write commands are not being serviced by hybrid drive 100. However, because significant electrical energy is used by microprocessor-based controller 133 and read/write channel 137 in active servo state 310, in some embodiments, hybrid drive 100 changes to a lower power consumption state when one or more conditions are met. As shown in FIG. 3, these conditions may include one or more of: float timer expiration 311, standby transition 312, and sleep command 313.

When float timer expiration 311 occurs, hybrid drive 100 changes from active servo state 310 to intermediate power consumption state 320, which is described below. Float timer expiration 311 can be configured to take effect when no commands are satisfied by accessing storage disk 110 for more than a predetermined time period, i.e., upon expiration of an adjustable float timer. For example, a typical duration for such a predetermined time period may be approximately 50 to 150 milliseconds, and in some embodiments is adjusted in length based on a hit rate of accesses to flash memory device 135. In some embodiments, a float timer is started when a command, i.e., a read or write command, is satisfied by accessing storage disk 110. The float timer is reset to zero and restarted when a received command is satisfied by accessing storage disk 110. Thus, float timer expiration 311 takes effect when the float timer exceeds the predetermined time period described above, and hybrid drive 100 changes to intermediate power consumption state 320. In some embodiments, any read or write commands satisfied by accessing storage disk 110 resets the float timer to zero, and in other embodiments, only read or write commands that are both satisfied by accessing storage disk 110 and that are received from host 10 reset the float timer to zero.

It is noted that commands (either received by hybrid drive 100 from host 10 or initiated by hybrid drive 100 itself) that are satisfied without accessing storage disk 110 do not reset the above-described float timer. Consequently, even though read and/or write commands may be frequently received by hybrid drive 100 from host 10 and/or initiated by hybrid drive 100, portions of hybrid drive 100 associated with storage disk 110 can be changed from active servo state 310 to intermediate power consumption state 320 when said commands are satisfied by accessing RAM 134 and/or flash memory device 135 but not storage disk 110.

When standby transition 312 occurs, hybrid drive 100 changes from a current energy consumption state to standby state 340, in which hybrid drive 100 spins down storage disk 110, read/write head 127 is parked, and hybrid drive 100 expends essentially no energy on mechanical operations. Standby transition 312 may occur when hybrid drive 100 is in one of several power states, including active servo state 310, intermediate power consumption state 320, and park state 330. In some embodiments, standby transition 312 can be configured to take effect when either one of two conditions are met: 1) a "standby" command is received from host 10 or 2) no commands from host 10 are satisfied by accessing storage disk 110 for more than a predetermined time period, such as a standby timer, where said time period is adjusted based on a hit rate of accesses to storage disk 110. In other embodiments, standby transition 312 can be configured to take effect when: 1) a "standby" command is received from host 10 or 2) no commands, either from host 10 or initiated by hybrid drive 100, are satisfied by accessing storage disk 110 for more than a predetermined time period (e.g., a standby timer), where said time period is adjusted based on a disk access history of storage disk 110, described above.

Generally, the predetermined time period associated with standby transition 312 is substantially longer than that associated with float timer expiration 311. For example, a typical duration of time associated with initiating standby transition 312 can be on the order of several minutes rather than milliseconds. In some embodiments, a standby timer is started when a command is satisfied by accessing storage disk 110, and the standby timer is reset to zero and restarted when a command is next satisfied by accessing storage disk 110. In other embodiments, the standby timer is started when a command received from host 10 is satisfied by accessing storage disk 110, while a command that is initiated by disk drive 110 and is satisfied by accessing storage disk 110 does not reset the standby timer to zero.

When standby transition 312 occurs, i.e., when the standby timer exceeds the predetermined time period described above, hybrid drive 100 changes to standby state 340. In some embodiments, read/write commands do not generally reset the herein-described standby timer when said commands are 1) initiated by hybrid drive 100 itself, and/or 2) satisfied without accessing storage disk 110.

Sleep command 313, when received from host 10, causes hybrid drive 100 to change from a current power state to sleep state 350. Sleep state 350 is similar to standby state 340, since hybrid drive 100 spins down storage disk 110, read/write head 127 is parked, and hybrid drive 100 expends essentially no energy on mechanical operations. Sleep state 350 differs from standby state 340 in that hybrid drive 100 leaves sleep state 350 via host soft reset 314 from host 10 or if hybrid drive 100 is powered off and then back on. In contrast, hybrid drive 100 can generally exit standby state 340 when any of a number of commands (including R/W commands) are received from host 10. Because the sleep state 350 is a more restrictive state, hybrid drive 100 generally dissipates much less power in sleep state 350 than in standby state 340. Sleep command 313 may occur when hybrid drive 100 is in one of several power states, including active servo state 310, intermediate power consumption state 320, and park state 330.

Intermediate power consumption state 320, in which the servo system of hybrid drive 100 is not used to provide continuous position control of read/write head 127, uses less power than active servo state 310 and more power than park state 330. For example, in some embodiments, microprocessor-based controller 133 may apply a predetermined constant bias to voice coil motor 128 to hold read/write head 127 in place, thereby "floating" read/write head 127 rather than actively servoing the position of read/write head 127. In alternative embodiments, a low-frequency servo mode may be used in intermediate power consumption state 320, in which limited servo control is used to position read/write head 127 in an approximate location. For example, the servo system of hybrid drive 100 may be activated for a single or a relatively small number of samples for each revolution of storage disk 110, so that the position of read/write head 127 is approximately known without the relatively high energy cost associated with constantly servoing read/write head 127 over a particular data storage track of storage disk 110.

Intermediate power consumption state 320 allows relatively fast response to read or write commands that involve accessing storage disk 110. For example, when hybrid drive 100 is in intermediate power consumption state 320 and receives a read or write command, seeking to a desired location on storage disk 110 in response to said command can be completed in a few milliseconds to a few tens of milliseconds. In contrast, when disk drive is in park state 320, seeking to a desired location on storage disk 110 in response to said command generally requires a few hundred milliseconds. In some embodiments, hybrid drive 100 changes from intermediate power consumption state 320 to a lower power consumption state when one or more conditions are met. As shown in FIG. 3, these conditions may include one or more of: standby transition 312, sleep command 313 (both described above), park timer expiration 321, or an idle-immediate command, in which hybrid drive 100 changes from either active servo state 310 or intermediate power consumption state 320 to park state 330.

When park timer expiration 321 occurs, hybrid drive 100 changes from intermediate power consumption state 320 to park state 330. In park state 330, storage disk 110 continues to spin at the normal rotational velocity, but read/write head 127 is parked to reduce aerodynamic resistance to spinning the data storage disk. In this way, current required for the rotation of storage disk 110 is reduced. Furthermore, in park state 330, read/write head 127 is protected from mechanical shock experienced by hybrid drive 100. Park timer expiration 321 can be configured to take effect when no commands are satisfied by accessing storage disk 110 for more than a predetermined time period, such as a park timer. Alternatively, park timer expiration 321 can be configured to take effect when no commands from host 10 are satisfied by accessing storage disk 110 for more than a predetermined time period, e.g., a park timer. As noted above, according to some embodiments, a park timer or other predetermined time period associated with initiating park state 330 is adjusted during operation of hybrid drive based on disk access history of storage disk 110.

Generally, the predetermined time period associated with park timer expiration 321 is substantially longer than that associated with float timer expiration 311. For example, a typical duration of time associated with park timer expiration 321 can be on the order of several seconds rather than the milliseconds associated with float timer expiration 311. In some embodiments, a park timer is started when a command is satisfied by accessing storage disk 110, and the park timer is reset to zero and restarted when a command is satisfied by accessing storage disk 110. When park timer expiration 321 occurs, i.e., when the park timer exceeds the predetermined time period described above, hybrid drive 100 changes to park state 330. It is noted that commands that are satisfied without accessing storage disk 110 do not generally reset the herein-described park timer. Said commands can be either received by hybrid drive 100 from host 10 or initiated by hybrid drive 100 itself, such as when microprocessor-based controller 133 determines that data stored in flash memory device 135 should be written on data storage disk 110.

In addition to changing to a lower power consumption state when certain events occur, e.g., float timer expiration 311, standby transition 312, sleep command 313, and park timer expiration 321, hybrid drive 100 may also change to a higher power consumption state when certain events occur. Specifically, when active servo transition 341 occurs, hybrid drive 100 may be configured to change to active servo state 310, as shown in FIG. 3. In some embodiments, active servo transition 341 takes place when a read or write command is satisfied by accessing storage disk 110. For example, if a current version of the data associated with a read command from host 10 is not stored in RAM 134 or flash memory 135, storage disk 110 is accessed by microprocessor-based controller 133 to satisfy said read command. Thus, even when hybrid drive 100 is in a low power consumption state, such as standby state 340 or park state 330, hybrid drive 100 changes to active servo state 310 so that storage disk 110 can be accessed to satisfy the command received from host 10.

In some embodiments, hybrid drive 100 may change to active servo state 310 in response to data being flushed to storage disk 110 from flash memory device 135. For example, a portion of flash memory device 135 may be used to store "dirty" data, which are data that are only stored in flash memory device 135 and are not also stored on storage disk 110. Furthermore, hybrid drive 100 may also be configured to maintain a predetermined maximum threshold for the portion of flash memory device 135 used to store dirty data. Consequently, when said maximum threshold is exceeded, hybrid drive 100 generally "flushes" excess dirty data to storage disk 110, i.e., hybrid drive 100 writes a corresponding copy of the excess dirty data on storage disk 110, and flags the copied data in flash memory device 135 as "non-dirty" data. Thus, in some situations, hybrid drive 100 may flush dirty data to storage disk 110, even though hybrid drive 100 is in intermediate power consumption state 320, park state 330, or standby state 340. In such situations, hybrid drive 100 changes to active servo state 310 so that the data flushing process can be performed. For example, after hybrid drive 100 changes to a lower power consumption state as a result of float timer expiration 311, standby transition 312, sleep command 313, or park timer expiration 321, host 10 may then send write commands to hybrid drive 100. Ordinarily, hybrid drive 100 may accept write data directly into flash memory device 135 to prevent activating the portions of hybrid drive 100 associated with storage disk 110. However, if flash memory device 135 is full or already stores the maximum allowable quantity of dirty data, microprocessor-based controller 133 can change the power state of hybrid drive 100 to active servo state 310 and begin to copy dirty data in flash memory device 135 to storage disk 110.

In some embodiments, storage disk 110 may be accessed as a result of other activities besides in response to commands from host 10. Advantageously, in such embodiments, timers for measuring time elapsed since storage disk 110 was last accessed in response to a host command may not be reset when storage disk 110 is accessed as a result of said non-host related activities. For example, dirty data being flushed from flash memory device 135 or RAM 134 may be considered such non-host related activities.

Figure 4:
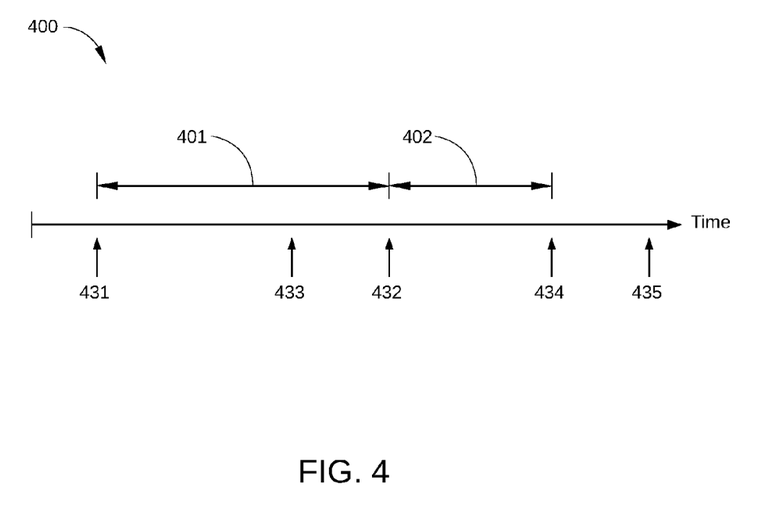
FIG. 4 is a timeline illustrating how a hit rate of commands to a flash memory device can be used to adjust a predetermined time period indicating when the hybrid drive of FIG. 1 changes to a lower power consumption state.

FIG. 4 is a timeline 400 illustrating how a hit rate of commands resulting in accessing flash memory device 135 can be used to adjust a predetermined time period, where the predetermined time period indicates when a magnetic data storage device in a hybrid drive changes to a lower power consumption state. Timeline 400 shows a predetermined time period 401 and a break-even time interval 402. Predetermined time period 401 may represent any timer or time threshold associated with a hybrid drive that, upon expiration, causes a magnetic data storage device in the hybrid drive to change to a lower power consumption state, such as a float timer, a standby timer, or a park timer.

Break-even time interval 402 is used as a metric for determining whether or not a magnetic data storage device has remained in a lower power consumption state for a sufficient length of time to justify the time and/or energy cost associated with returning to an active servo state from the lower power consumption state. In some embodiments, when the magnetic data storage device is accessed prior to the expiration of break-even time interval 402, predetermined time period 401 is considered too short and can be adjusted accordingly in some embodiments. When the magnetic data storage device is accessed after the expiration of break-even time interval 402, predetermined time period 401 is considered too long and can be adjusted accordingly in some embodiments. Embodiments using break-even time interval 402 are described in greater detail below.

In operation, storage disk 110 of hybrid drive 100 is accessed at time 431, and a timer associated with predetermined time period 401 is reset to zero. As shown, predetermined time period 401 expires at time 432. If storage disk 110 is accessed prior to the expiration of predetermined time period 401, for example at time 433, the timer associated with predetermined time period 401 is reset to zero. In other words, predetermined time period 401 is shifted along timeline 400 until starting at time 433. If storage disk 110 is not accessed prior to the expiration of predetermined time period 401, storage disk 110 and the portions of hybrid drive 100 associated with accessing storage disk 110 are changed to the lower power consumption state. For example, when predetermined time period 401 represents a a park timer, at time 433 hybrid drive 100 enters park state 330 (shown in FIG. 3) and read/write head 127 is parked.

According to embodiments of the invention, the length of predetermined time period 401 is adjusted periodically based on disk access history of storage disk 110. This adjustment may take place at regular intervals, in response to a particular event or events occurring in hybrid drive 100, or a combination of both. For example, in some embodiments, the adjustment of the length of predetermined time period 401 occurs upon completion of a read or write command that results in storage disk 110 being accessed. In some embodiments, predetermined time period 401 is adjusted based on a hit rate of read/write commands that result in accesses to flash memory device 135. In other embodiments, predetermined time period 401 is adjusted based at least in part on a recovery time, during which hybrid drive 100 returns to an active servo state from a lower power consumption state. In yet other embodiments, predetermined time period 401 is adjusted based on a combination of said hit rate and said recovery time.

In some embodiments, hit rate is determined by calculating what proportion of read/write commands received by hybrid drive 100 result in accessing flash memory device 135. Such read/write commands are hereinafter referred to as "NAND hits." For example, in one embodiment, the proportion of NAND hits relative to total read/write commands received by hybrid drive 100 is tracked for a plurality of groups of read/write commands, and a running average of hit rate is calculated for each group. In one such embodiment, each group includes 100 commands. As each read or write command is received by hybrid drive 100, an indicator or flag associated with the command is set to indicate whether the command resulting in flash memory device 135 being accessed rather than storage disk 110. Once a group of 100 such commands have been received by hybrid drive 100, the proportion of NAND hits to the total 100 commands in the group is calculated and stored. The hit rate of the most recent 256 groups of commands can then be used to calculate a running average of hit rate. This running average of hit rate, which in this case is for the 25,600 most recent commands received by hybrid drive 100, can be used to adjust predetermined time period 401 so that hybrid drive 100 operates in a more energy efficient manner.

In some embodiments, the length of predetermined time period 401 is adjusted by decrementing the length of predetermined time period 401 when a running average (or any other measure of NAND hit rate) of a large number of read and/or write commands exceeds a threshold hit rate value, e.g., 70%, 80%, 90%, etc. For example, when a hit rate value exceeds 95%, a park timer may be decreased by a specified length of time, e.g., one second. Thus, when the vast majority of read and/or write commands result in flash memory device 135 being accessed, hybrid drive 100 is configured to change to park mode 330 more quickly, since the likelihood of storage disk 100 being accessed is relatively low. Conversely, in such embodiments, the length of predetermined time period 401 is also adjusted by incrementing the length of predetermined time period 401 by a specified length of time when a running average or other measure of hit rate of read and/or write commands is less than the threshold hit rate value. In this way, hybrid drive 100 is configured to change to park mode 330 after a longer idle time when the likelihood of storage disk 100 being accessed increases. It is noted that, in such embodiments, predetermined time period 401 may be increased by a predetermined time increment value or by a variable time increment value, such as a time increment value that is a function of the current hit rate value.

The length of predetermined time period 401 can be adjusted using hit rate in other ways as well, and is not limited to the running average approach described above. In some embodiments, the length of predetermined time period 401 can be adjusted using a weighted average of hit rate. For example, when hit rate is calculated for a plurality of groups of commands, e.g., 256 groups, the more recent groups of commands may be weighted to have more effect on the average hit rate value. In other embodiments, the length of predetermined time period 401 can be adjusted based at least in part on the rate of change of hit rate from the oldest groups of commands to the most recently received groups of commands. In such embodiments, a predictive element is thus introduced into the adjustment of predetermined time period 401, and is not purely a reaction to past behavior of hybrid drive 100.

As noted above, a threshold hit rate value may be used to determine whether predetermined time period 401 is increased or decreased. Such a threshold hit rate value may be a percentage, a ratio, and the like. Furthermore, a different threshold hit rate may be used for the timer associated with each different power state of hybrid drive 100. Thus, in some embodiments, a first threshold hit rate is associated with a float timer of hybrid drive 100, a second threshold hit rate is associated with a park timer of hybrid drive 100, and a third threshold hit rate is associated with a standby timer of hybrid drive 100.

The hit rate of a group of read/write commands, a running average of group hit rate, and other such factors may be calculated at any technically feasible time during operation of hybrid drive 100. In some embodiments, these factors may be calculated when hybrid drive 100 is idle or substantially idle. In other embodiments, these factors may be calculated periodically, or whenever a specific event occurs, such as when hybrid drive 100 completes an access to storage disk 100. In some embodiments, microprocessor-based controller 133 performs such calculations, however, in other embodiments, a dedicated logic circuit, firmware, a software construct, or any other technically feasible entity associated with hybrid drive 100 may be configured to perform such calculations.

In some embodiments, predetermined time period 401 is adjusted based at least in part on a recovery time during which hybrid drive 100 returns to an active servo state from a lower power consumption state. In such embodiments, break-even time interval 402 may be used. Break-even time interval 402 represents a target time interval during which a magnetic data storage device, such as storage disk 110, remains in a lower power consumption state in order to justify the energy and/or time cost associated with returning to an active servo state from the lower power consumption state. In some embodiments, the length of break-even time interval 402 is selected such that a quantity of energy saved by the magnetic storage device during break-even time interval 402 at the lower power consumption state is substantially equal to or greater than a quantity of energy used by the magnetic storage device to return to an active servo state.

Thus, when the magnetic storage device has changed to a lower power consumption state at the end of predetermined time period 401 (time 432), and is accessed after break-even time interval 402 (e.g., at time 435), at least as much energy is saved by the magnetic storage device during break-even time interval 402 as is expended by the magnetic storage device in returning to an active servo state.

In such embodiments, when the magnetic storage device is accessed prior to the expiration of break-even time interval 402 (i.e., between time 432 and time 434), predetermined time period 401 is considered too short and is adjusted to be longer. In some embodiments, this adjustment includes incrementing the length of predetermined time period 401 by a predetermined time increment or a time increment that is a function of when the magnetic storage device is accessed during break-even time interval 402. Conversely, when the magnetic storage device is accessed after the expiration of break-even time interval 402 (i.e., after time 434), predetermined time period 401 is considered too long and can be adjusted to by decrementing the length of predetermined time period 401.

In some embodiments, the length of break-even time interval 402 is selected based at least in part on a recovery time during which the magnetic storage device returns to an active servo state from the lower power consumption state. Because such a recovery time can affect quality of user experience, the duration of the recovery time is included as a factor in determining the length of break-even time interval 402. For example, by changing a magnetic storage device in hybrid drive 100 to a standby state, a user experiences a delay of up to several seconds when the magnetic storage device returns to an active servo state. Because such a delay significantly affects quality of user experience, break-even time interval 402 may be selected to be longer than simply a target length of time that the magnetic storage device remains at the lower power consumption state in order to compensate for the energy used to return to an active servo state. In such embodiments, break-even time interval 402 may have a longer duration to compensate for such effects on user experience by reducing how often the magnetic storage device is changed to a lower power consumption state and then returned to an active state after a short time interval. The use of break-even time interval 402 in this way is particularly advantageous when used for a standby timer.

In some embodiments, an initial value for a hit rate or average hit rate is set at startup of hybrid drive 100. This is because few or no read or write commands have been received by hybrid drive 100 at startup, and therefore the groups of commands used to determine a hit rate or other ratio of NAND hits will otherwise have null values. In such embodiments, the initial hit rate value may be selected by filling an array used for tracking the hit rate of each group of commands with a seed value. This seed value can be selected to elicit a particular operational behavior from hybrid drive 100. For example, hybrid drive 100 can be configured to be more responsive to user inputs at startup by seeding very low initial hit rate values in the array for tracking the hit rate of each group of commands, thereby generating a long time duration for a float timer, a standby timer, and a park timer. In such an embodiment, hybrid drive 100 generally does not change to a lower power consumption state at startup and remains in a higher performance mode, resulting in a higher quality user experience. In another example embodiment, hybrid drive 100 can be configured to operate in a more power efficient manner upon startup by seeding very high initial hit rate values in the array for tracking the hit rate of each group of commands, thereby generating a short time duration for the float timer, standby timer, and park timer. Such a configuration may be advantageous upon startup when hybrid drive 100 is coupled to a host device that is started up with low battery power. In some embodiments, the configuration of hybrid drive 100 upon startup can be a function of the battery-state at that time, favoring low power-consumption if the battery change is low, and favoring higher performance if the battery charge is high. In some embodiments, the power-scheme used by the operating system (as selected by a user of the host device) could influence the initial configuration of the hybrid drive 100.

Figure 5:
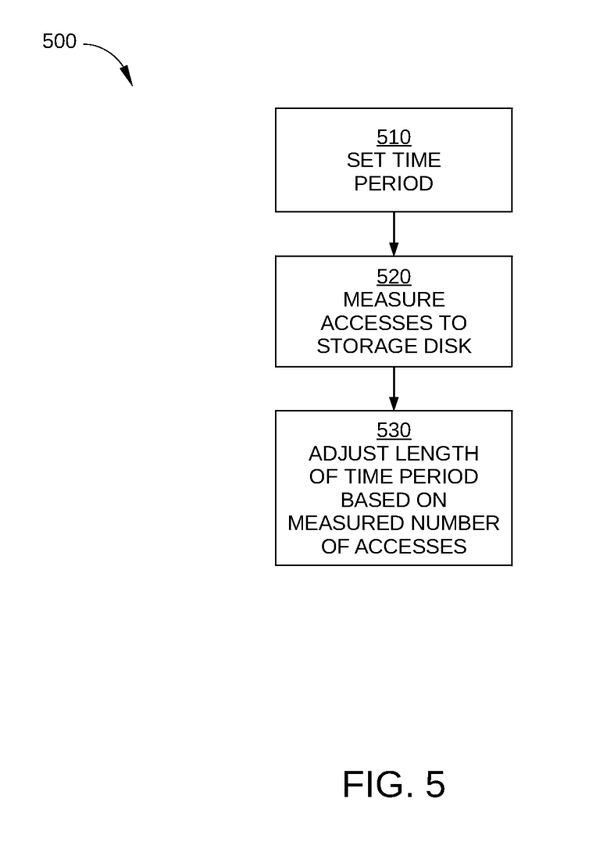
FIG. 5 sets forth a flowchart of steps of a method for power management in a data storage device that includes a magnetic storage device and a nonvolatile storage device, according to one or more embodiments.

FIG. 5 sets forth a flowchart of method steps for power management in a data storage device that includes a magnetic storage device and a nonvolatile storage device, according to one or more embodiments. Although the method steps are described in conjunction with hybrid drive 100 in FIGS. 1 and 2, persons skilled in the art will understand that method 500 may be performed with other types of data storage systems. The control algorithms for method 500 may reside in and/or be performed by microprocessor-based controller 133, host 10, or any other suitable control circuit or system. For clarity, method 500 is described in terms of microprocessor-based controller 133 performing steps 510-530.

As shown, method 500 begins at step 510, where microprocessor-based controller 133 or other suitable control circuit or system sets a time period, such as predetermined time period 401 in FIG. 4. Thus, predetermined time period 401 begins in step 510. In some embodiments, the time period is set each time storage disk 110 is accessed.

In step 520, microprocessor-based controller 133 measures a number of accesses to flash memory device 135, e.g., as a result of hybrid drive 100 receiving read or write commands that do not require access to storage disk 110. In some embodiments, the measured number of accesses are used to determine a hit rate value for a plurality of read/write commands most recently received by hybrid drive 100. In some embodiments, the hit rate may be a running average of a NAND hit rate over a plurality of groups of read/write commands.

In step 530, microprocessor-based controller 133 adjusts a length of predetermined time period 401 based on the measured number of accesses. For example, the length of predetermined time period 401 may be decremented by a predetermined time decrement value when the number of accesses exceeds a threshold value, and the length of predetermined time period 401 may be incremented by a predetermined time decrement value when the number of accesses is less than the threshold value.

Figure 6:
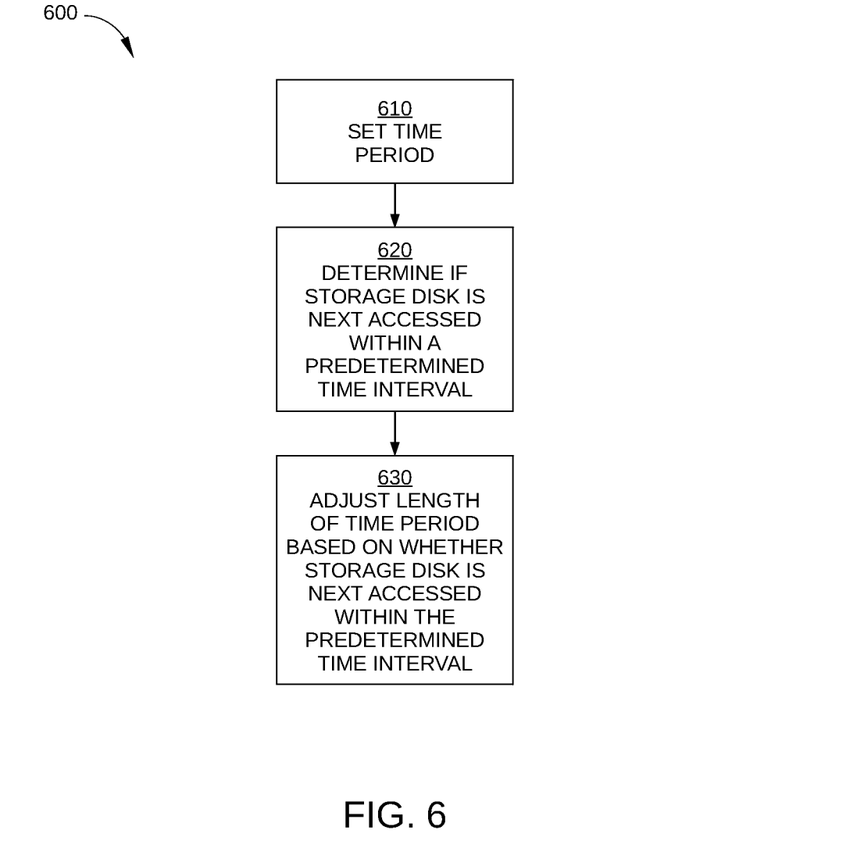
FIG. 6 sets forth a flowchart of steps of another method for power management in a data storage device that includes a magnetic storage device and a nonvolatile storage device, according to one or more embodiments.

FIG. 6 sets forth a flowchart of method steps for power management in a data storage device that includes a magnetic storage device and a nonvolatile storage device, according to one or more embodiments. Although the method steps are described in conjunction with hybrid drive 100 in FIGS. 1 and 2, persons skilled in the art will understand that method 600 may be performed with other types of data storage systems. The control algorithms for method 600 may reside in and/or be performed by microprocessor-based controller 133, host 10, or any other suitable control circuit or system. For clarity, method 600 is described in terms of microprocessor-based controller 133 performing steps 610-630.

As shown, method 600 begins at step 610, where microprocessor-based controller 133 or other suitable control circuit or system sets a time period, such as predetermined time period 401 in FIG. 4. Thus, predetermined time period 401 begins in step 610. In some embodiments, the time period is set each time storage disk 110 is accessed.

In step 620, microprocessor-based controller 133 determines whether or not a time that storage disk 110 is next accessed is within a predetermined time interval, such as break-even time interval 402, after predetermined time period 401 expires.

In step 630, microprocessor-based controller 133 adjusts a length of predetermined time period 401 based on whether or not the time that storage disk 110 is next accessed is within break-even time interval 402. When storage disk 110 is next accessed within break-even time interval 402, predetermined time period 401 is increased. When storage disk 110 is next accessed after break-even time interval 402 expires, predetermined time period 401 is decreased.

In sum, embodiments described herein provide systems and methods for power management in a data storage device. The data storage device uses disk access history of the magnetic storage device to adjust a duration of a time period based on the hit rate, where the time period may be an idle time that occurs before the data magnetic storage device changes to a lower power consumption state. Consequently, the magnetic storage device can be advantageously changed to a lower power consumption state in a fashion that adapts to recent behavior of the magnetic storage device.

While the foregoing is directed to specific embodiments, other and further embodiments may be devised without departing from the basic scope thereof, and the scope thereof is determined by the claims that follow.

We claim:

1. A method of power management in a data storage device that includes a magnetic storage device and a solid-state nonvolatile storage device, the method comprising:
    setting a time period each time the magnetic storage device is accessed, the magnetic storage device being changed to a lower power consumption state when the time period expires;
    measuring a number of accesses to the data storage device that are accesses to the solid-state nonvolatile storage device; and
    adjusting a length of the time period based on the measured number of accesses.

2. The method of claim 1, wherein adjusting the length of the time period comprises decrementing the length of the time period when the number of accesses exceeds a threshold value and incrementing the length of the time period when the number of accesses is less than the threshold value.

3. The method of claim 2, wherein decrementing the length of the time period comprises decreasing the time period by a predetermined time decrement value and incrementing the length of the time period comprises increasing the time period by a predetermined time increment value.

4. The method of claim 1, further comprising measuring a total number of accesses to the data storage device, the total number of accesses including accesses to the non-magnetic nonvolatile storage device and accesses to the magnetic storage device.

5. The method of claim 4, further comprising determining a ratio of the number of accesses to the solid-state nonvolatile storage device to the total number of accesses to the data storage device.

6. The method of claim 5, further comprising determining a rate of change of the ratio and wherein adjusting the length of the time period is based at least in part on the rate of change.

7. The method of claim 5, wherein adjusting the length of the time period comprises decrementing the length of the time period when the ratio exceeds a threshold value and incrementing the length of the time period when the ratio is less than the threshold value.

8. The method of claim 1, wherein the lower power consumption state comprises a power consumption state that uses less power than an active servo state.

9. The method of claim 8, wherein the lower power consumption state comprises one of: 1) a float state in which a servo system of the magnetic storage device is not used to provide continuous position control of a read/write head of the magnetic storage device; 2) a low-frequency servo state in which a servo system of the magnetic storage device provides position control of a read/write head of the magnetic storage device using no more than a portion of the servo wedges on a storage disk of the magnetic storage device; 3) a parked state in which a read/write head of the magnetic storage device is parked; and 4) a standby state in which a storage disk of the magnetic storage device is not spinning.

10. A method of power management in a data storage device that includes a magnetic storage device and a solid-state nonvolatile storage device, the method comprising:
    receiving multiple requests to access the magnetic storage device and the solid-state nonvolatile storage device and, responsive thereto, accessing the magnetic storage device and the solid-state nonvolatile storage device;
    setting a time period each time the magnetic storage device is accessed, the magnetic storage device being changed to a lower power consumption state when the time period expires;

determining whether or not a time that the magnetic storage device is next accessed is within a predetermined time interval after the time period expires; and adjusting the length of the time period based on whether or not the time the magnetic storage device is next accessed is within the predetermined time interval.

11. The method of claim 10, wherein a length of the time interval is selected such that a quantity of energy saved by the magnetic storage device during the time interval by the magnetic storage device being changed to the lower power consumption state is substantially equal to or greater than a quantity of energy used by the magnetic storage device to return to an active servo state.

12. The method of claim 10, wherein a length of the time interval is selected based at least in part on a recovery time during which the magnetic storage device returns to an active servo state from the lower power consumption state.

13. The method of claim 10, wherein adjusting the length of the time period comprises, if the time the magnetic storage device is next accessed is within the predetermined time interval, increasing the length of the time period.

14. The method of claim 13, wherein increasing the length of the time period comprises incrementing the length of the time period by a predetermined time increment.

15. The method of claim 13, wherein increasing the length of the time period comprises increasing the length of the time period time by a time increment based on one or more recovery costs, each recovery cost being a difference between a quantity of energy saved by the magnetic storage device while operating at a reduced power consumption state and a quantity of energy used by the magnetic storage device to return to an active servo state from the reduced power consumption state.

16. The method of claim 10, wherein adjusting the length of the time period comprises, if the time the magnetic storage device is next accessed is not within the predetermined time interval, decreasing the duration of the time period.

17. The method of claim 16, wherein decreasing the length of the time period comprises decrementing the length of the time period by a predetermined time decrement.

18. The method of claim 16, wherein decreasing the length of the time period comprises decreasing the length of the time period time by a time increment based on one or more recovery costs, each recovery cost being a difference between a quantity of energy saved by the magnetic storage device while operating at a reduced power consumption state and a quantity of energy used by the magnetic storage device to return to an active servo state from the reduced power consumption state.

19. The method of claim 10, wherein the lower power consumption state comprises one of: 1) a float state in which a servo system of the magnetic storage device is not used to provide continuous position control of a read/write head of the magnetic storage device; 2) a low-frequency servo state in which a servo system of the magnetic storage device provides position control of a read/write head of the magnetic storage device using no more than a portion of the servo wedges on a storage disk of the magnetic storage device; 3) a parked state in which a read/write head of the magnetic storage device is parked; and 4) a standby state in which a storage disk of the magnetic storage device is not spinning.

20. A data storage device, comprising:
a magnetic storage device;
a solid-state nonvolatile storage device; and
a controller configured to:
set a time period each time the magnetic storage device is accessed, the magnetic storage device being changed to a lower power consumption state when the time period expires;
measure a number of accesses to the data storage device that are accesses to the solid-state nonvolatile storage device; and
adjust a length of the time period based on the measured number of accesses.

* * * * *